United States Patent
Kusunoki et al.

(10) Patent No.: US 7,482,913 B2
(45) Date of Patent: Jan. 27, 2009

(54) VEHICLE INFORMATION PROCESSING APPARATUS, VERIFICATION METHOD OF A VEHICLE INFORMATION PROCESSING APPARATUS, AND ID REGISTRATION METHOD OF A VEHICLE INFORMATION PROCESSING APPARATUS

(75) Inventors: Hideki Kusunoki, Nishikamo-gun (JP); Toru Sugiyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 215 days.

(21) Appl. No.: 11/480,462

(22) Filed: Jul. 5, 2006

(65) Prior Publication Data

US 2007/0023509 A1    Feb. 1, 2007

(30) Foreign Application Priority Data

Jul. 29, 2005    (JP)    .............................. 2005-220230

(51) Int. Cl.
    *B60C 23/02*    (2006.01)
(52) U.S. Cl. ..................... 340/442; 340/445; 73/146.5; 701/32
(58) Field of Classification Search ......... 340/442–447, 340/457; 702/138, 98; 73/146.5, 146; 701/1, 701/29, 32, 33; 235/384
    See application file for complete search history.

(56) References Cited

U.S. PATENT DOCUMENTS 6,880,395 B2 *    4/2005    Norimatsu et al. ......... 73/146.4
6,915,229 B2 *    7/2005    Taguchi et al. ............... 702/138
6,920,785 B2 *    7/2005    Toyofuku ..................... 73/146
7,231,274 B2 *    6/2007    Moulds et al. .............. 700/115

FOREIGN PATENT DOCUMENTS

| JP | 9-256703 | 9/1997 |
| JP | 2000-103209 | 4/2000 |
| JP | 2003-276410 | 9/2003 |

* cited by examiner

*Primary Examiner*—Anh V La
(74) *Attorney, Agent, or Firm*—Oblon, Spivak, McClelland, Maier & Neustadt, P.C.

(57) ABSTRACT

A vehicle information processing apparatus provided in a vehicle is provided with a TPMS valve that includes an air pressure sensor which obtains a tire air pressure as wheel information and a wheel-side communication device that transmits the wheel information and an ID unique to that wheel-side communication device at regular intervals; an ECU which receives the wheel information from the wheel-side communication device in each TPMS valve via a vehicle body-side communication device and processes that wheel information; and an onboard battery which supplies power to the ECU. Upon receiving a command to shift into a verification mode while power is being supplied from the onboard battery, the ECU performs a predetermined verification based on a signal transmitted at regular intervals from each wheel-side communication device. After receiving the command to shift into the verification mode, the ECU remains in the verification mode until a preset condition is satisfied.

20 Claims, 5 Drawing Sheets

VEHICLE INFORMATION PROCESSING APPARATUS, VERIFICATION METHOD OF A VEHICLE INFORMATION PROCESSING APPARATUS, AND ID REGISTRATION METHOD OF A VEHICLE INFORMATION PROCESSING APPARATUS

INCORPORATION BY REFERENCE

The disclosure of Japanese Patent Application No. 2005-220230 filed on Jul. 29, 2005, including the specification, drawings and abstract is incorporated herein by reference in its entirety.

BACKGROUND OF THE INVENTION

1. Technical Field of the Invention

This invention relates to technology for processing vehicle information relating to a vehicle. More particularly, the invention relates to technology which uses a plurality of vehicle information obtaining means for obtaining vehicle information and transmitting that obtained vehicle information and an ID unique to each vehicle information obtaining means at regular intervals.

2. Description of Related Art

Japanese Patent Application Publication No. JP-A-2003-276410, for example, proposes a wireless wheel state monitoring apparatus for monitoring the state of a wheel provided on a vehicle. The wireless wheel state monitoring apparatus includes a plurality of transmitters, each of which is mounted on a wheel of a wheel/tire assembly, and a receiver provided on a body of the vehicle. Each transmitter measures the air pressure and the like of the tire of the corresponding wheel and transmits the obtained wheel information to the vehicle body-side receiver. The receiver then processes the wheel information received from the transmitter in a predetermined manner. In this case, unique identification data (ID) is assigned to each transmitter, and each transmitter transmits a signal containing both the wheel information and its own unique ID. Meanwhile, the IDs of all of the transmitters for the vehicle provided with that receiver are registered in advance with the receiver. When an ID contained in a received signal matches one of the registered IDs, the receiver processes the received signal.

When registering the ID of each transmitter with the receiver in this wheel state monitoring apparatus, a commander that is connected to the receiver by a cable is first brought close to the intended transmitter. Next, an operation switch of the commander is pushed such that a command signal (i.e., a trigger signal) is sent from the commander to the transmitter. A signal indicating that the operation switch is on is also sent to the receiver via the cable. The transmitter then transmits a reply signal containing its ID to the receiver in response to the command signal from the commander. Upon receiving the reply signal from the transmitter while the operation switch is on, the receiver stores the ID contained in the received signal.

Another example of technology for registering the ID of each transmitter with a receiver in this kind of wheel state monitoring apparatus is disclosed in Japanese Patent Application Publication No. JP-A-2000-103209, for example, which describes a system that performs ID registration by forcibly changing the tire air pressure. When registering the IDs of the transmitters with the receiver in this system, the tire air pressure is changed by letting air out of the tire, which is done by pushing a shaft portion of a tire air valve after a registration switch of the receiver has been turned on. Through this operation, the transmitter mounted on the wheel detects the change in pressure in the tire, such that, at that point the transmitter immediately transmits data to the receiver as an abnormal transmission. When the receiver receives the signal from the transmitter, the received ID is written in EEPROM.

An example of technology for registering the ID of a transmitter in a keyless entry system for a vehicle is disclosed in Japanese Patent Application Publication No. JP-A-9-256703, for example, which describes a vehicular ID system that forcibly sets a vehicle body-side receiver in a registration mode for a predetermined period of time after power starts to be supplied from a power supply to the receiver. In this system, the receiver is structured such that it is made to enter the registration mode for a predetermined period of time after power starts to be supplied from the power supply. When a user operates the transmitter while the receiver is in the registration mode, the ID of that transmitter is registered with the receiver.

As described above, however, using the commander and successively changing the tire air pressure in each wheel when registering the IDs require special equipment and a lot of labor, which goes against the demand to reduce labor in the production and maintenance processes of a vehicle. Further, with an apparatus such as that described above which monitors the wheel state, the transmission state of the transmitters and the like must be verified. During this kind of verification as well, it is necessary to eliminate, to the greatest extent possible, the equipment and labor required for that verification.

SUMMARY OF THE INVENTION

The invention thus aims to provide a vehicle information processing apparatus, a verification method of a vehicle information processing apparatus, and an ID registration method of vehicle information processing apparatus, which enable various verifications and ID registration to be performed with less labor.

A vehicle information processing apparatus according to a first aspect of the invention is a vehicle information processing apparatus for processing vehicle information relating to a vehicle, which is characterised by including: a plurality of vehicle information obtaining devices that obtain vehicle information and transmitting, as a signal, the obtained vehicle information together with an ID unique to each of the vehicle information obtaining devices at regular intervals; a controller that receives the vehicle information from each of the vehicle information obtaining devices and processes that vehicle information; and a power supply which supplies power to the controller. The controller performs a predetermined verification based on the signal transmitted at regular intervals from each of the vehicle information obtaining devices upon receiving a command to shift into a verification mode while power is being supplied from the power supply. After the command to shift into the verification mode is received by the controller, the controller remains in the verification mode until a preset condition is satisfied.

The plurality of vehicle information obtaining devices included in this vehicle information processing apparatus are able to regularly transmit the obtained vehicle information and the ID unique to each vehicle information obtaining devices. Also, upon receiving the command to shift into the verification mode while power is being supplied from the power supply, the controller of the vehicle information processing apparatus performs a predetermined verification based on the signal transmitted at regular intervals from each vehicle information obtaining device. After receiving the command to shift into the verification mode, the controller remains in the verification mode until a preset condition has been satisfied, at which time the controller exits the verification mode. Accordingly, by simply sending the command to the controller to shift into the verification mode after it has been connected to a predetermined device, for example, the predetermined verification can then be performed using the regularly transmitted signals from the vehicle information obtaining devices, without using a device or the like to generate a trigger signal and without the manual labor involved. By establishing the condition for having the controller remain in (or exit) the verification mode based on, for example, the regular transmission cycle of the signal from each vehicle information obtaining device and/or the step of performing verification in the production line, for example, the verification is basically completed at the stage where a sufficient amount of time has passed after the controller received the command to shift into the verification mode. As a result, this vehicle information processing apparatus enables various related verification to be performed with much less labor.

A vehicle information processing apparatus according to a second aspect of the invention is a vehicle information processing apparatus for processing vehicle information relating to a vehicle, which is characterised by including: a plurality of vehicle information obtaining devices that obtain vehicle information and transmitting, as a signal, the obtained vehicle information together with an ID unique to each of the vehicle information obtaining devices at regular intervals; a controller that receives the vehicle information from each of the vehicle information obtaining devices and processes that vehicle information; and a power supply which supplies power to the controller. The controller performs ID registration for each of the vehicle information obtaining devices based on the signal transmitted at regular intervals from each of the vehicle information obtaining devices upon receiving a command to shift into an ID registration mode while power is being supplied from the power supply. After the command to shift into the ID registration mode is received by the controller, the controller remains in the ID registration mode until a preset condition is satisfied.

The plurality of vehicle information obtaining devices included in this vehicle information processing apparatus are able to regularly transmit the obtained vehicle information and the ID unique to each vehicle information obtaining device. Also, upon receiving the command to shift into the ID registration mode while power is being supplied from the power supply, the controller of the vehicle information processing apparatus performs ID registration for each vehicle information obtaining device based on the signal transmitted at regular intervals from each vehicle information obtaining device. After receiving the command to shift into the ID registration mode, the controller remains in the ID registration mode until a preset condition has been satisfied, at which time the controller exits the ID registration mode. Accordingly, by simply sending the command to the controller to shift into the ID registration mode after it has been connected to a predetermined device, for example, ID registration for each vehicle information obtaining device can then be performed using the regularly transmitted signals from the vehicle information obtaining device, without using a device or the like to generate a trigger signal and without the manual labor involved. By establishing the condition for having the controller remain in (or exit) the ID registration mode based on, for example, the regular transmission cycle of the signal from each vehicle information obtaining device and/or the step of performing verification in the production line, for example, ID registration is basically completed at the stage where a sufficient amount of time has passed after the controller received the command to shift into the ID registration mode. As a result, this vehicle information processing apparatus enables ID registration for each vehicle information obtaining devices to be performed with much less labor.

A verification method of a vehicle information processing apparatus according to a third aspect of the invention is a verification method of a vehicle information processing apparatus that is provided with a plurality of vehicle information obtaining devices that obtains vehicle information and transmitting, as a signal, the obtained vehicle information together with an ID unique to each of the vehicle information obtaining devices at regular intervals, and a controller that receives the vehicle information from each of the vehicle information obtaining devices and processes that vehicle information. This verification method includes the steps of:

a) shifting the controller into a verification mode for performing a predetermined verification based on the signal transmitted at regular intervals from each of the vehicle information obtaining devices;

b) determining whether the number of times that the supply of power to the controller was stopped or started exceeds a predetermined value after a command to shift the controller into the verification mode is received by the controller; and c) exiting the verification mode when it is determined in step b) that the number of times that the supply of power to the controller was stopped or started exceeds the predetermined value.

An ID registration method of a vehicle information processing apparatus according to a fourth aspect of the invention is an ID registration method of a vehicle information processing apparatus that is provided with a plurality of vehicle information obtaining devices that obtains vehicle information and transmitting, as a signal, the obtained vehicle information together with an ID unique to each of the vehicle information obtaining devices at regular intervals, and a controller that receives the vehicle information from each of the vehicle information obtaining devices and processes that vehicle information. This ID registration method includes the steps of:

a) shifting the controller into an ID registration mode for performing ID registration of each of the vehicle information obtaining devices based on the signal transmitted at regular intervals from each of the vehicle information obtaining devices;

b) determining whether the number of times that the supply of power to the controller was stopped or started exceeds a predetermined value after a command to shift the controller into the ID registration mode is received by the controller; and c) exiting the ID registration mode when it is determined in step b) that the number of times that the supply of power to the controller was stopped or started exceeds the predetermined value.

Accordingly, the invention makes it possible to reduce the labor involved in performing various verifications and ID registration in a vehicle information processing apparatus.

In the foregoing description, the controller is specified to perform verification or ID registration of vehicle information regularly transmitted by a plurality of vehicle information obtaining devices. However, the present invention is in principle also applicable to any kind of signal processing (such as plausibility check, etc.) other than the above described verification and ID registration. Therefore, deviating from the above described embodiments, the present invention is not to be understood to be restricted to the above described embodiments of verification and ID registration but shall include also a vehicle information processing apparatus and method in which a controller performs a predetermined signal processing (such as verification, ID registration, plausibility check, etc.) based on the signal transmitted at regular intervals from each of the vehicle information obtaining devices, each time upon receiving a command to shift into a signal processing mode (such as verification mode, ID registration mode, plausibility check mode, etc.) while power is being supplied from the power supply, and in which after the command to shift into the signal processing mode is received by the controller, the controller remains in the signal processing mode until a preset condition is satisfied. Accordingly, the object underlying the present invention could be generalized to provide a vehicle information processing apparatus and method which enable various signal processings to be performed with less labor.

DETAILED DESCRIPTION OF PREFERRED EMBODIMENTS

Example embodiments will hereinafter be described in detail with reference to the drawings.

Figure 1:
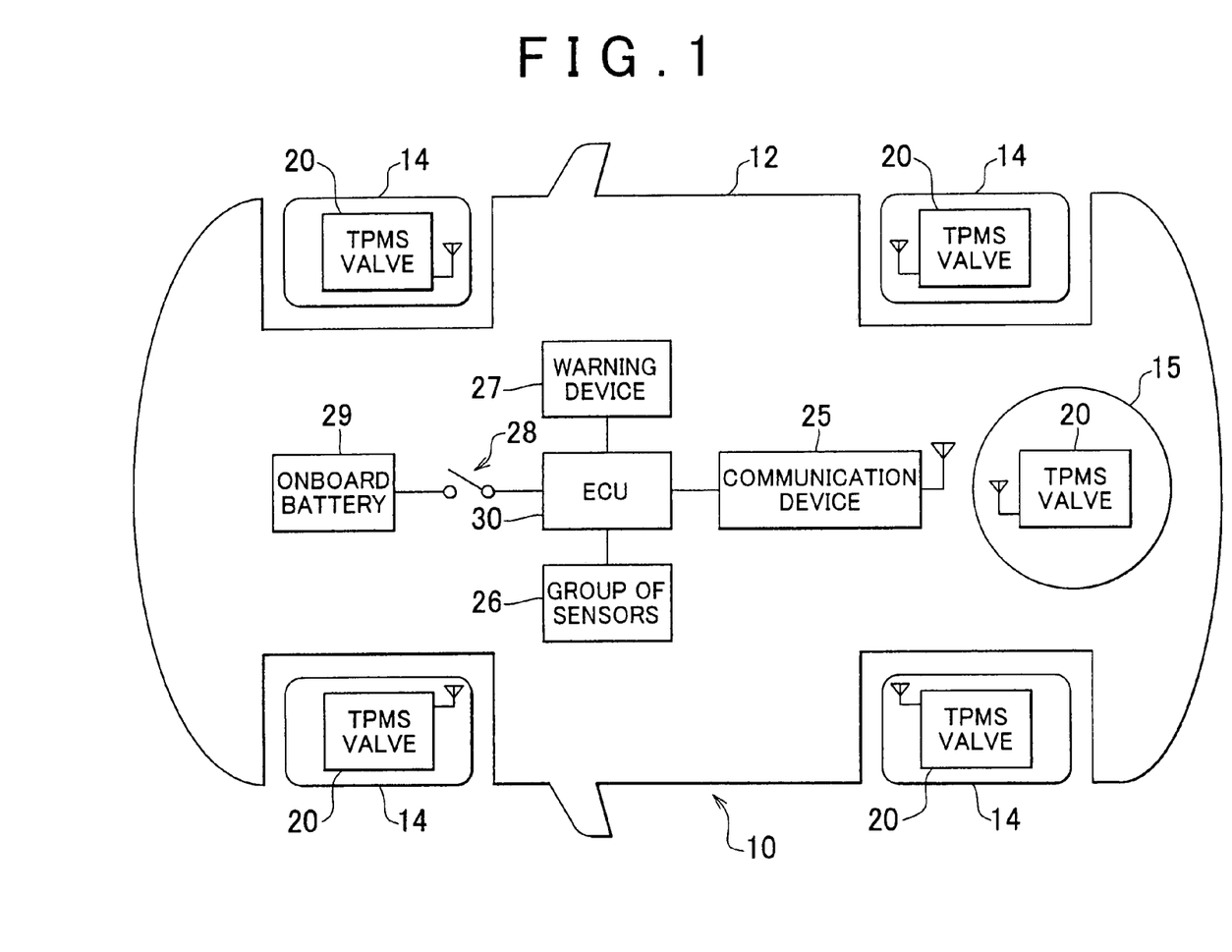
FIG. 1 is a block diagram schematically showing a vehicle provided with a vehicle information processing apparatus according to the invention.

FIG. 1 is a block view schematically showing a vehicle provided with a vehicle information processing apparatus according to the invention. A vehicle 10 in the drawing is provided with four running wheels 14 and one spare wheel 15 mounted to a vehicle body 12, a steering apparatus, not shown, which steers steered wheels from among the running wheels 14, and a driving source for running, also not shown, which drives driven wheels from among the running wheels 14, and the like. Each of the wheels 14 and 15 is a wheel/tire assembly that includes a wheel and a tire.

A TPMS valve 20 which serves as a tire air pressure regulating valve is attached to each wheel 14 and 15. Each TPMS valve 20 is fitted, via a flexible rubber grommet, washer, and bolt, or the like, in a mounting hole provided in the rim of each wheel. A valve cap, not shown, of the TPMS valve 20 protrudes outside the wheel rim. Air can be supplied into the tire by removing this valve cap and connecting a hose of an air supply device to a valve opening, not shown.

Figure 2:
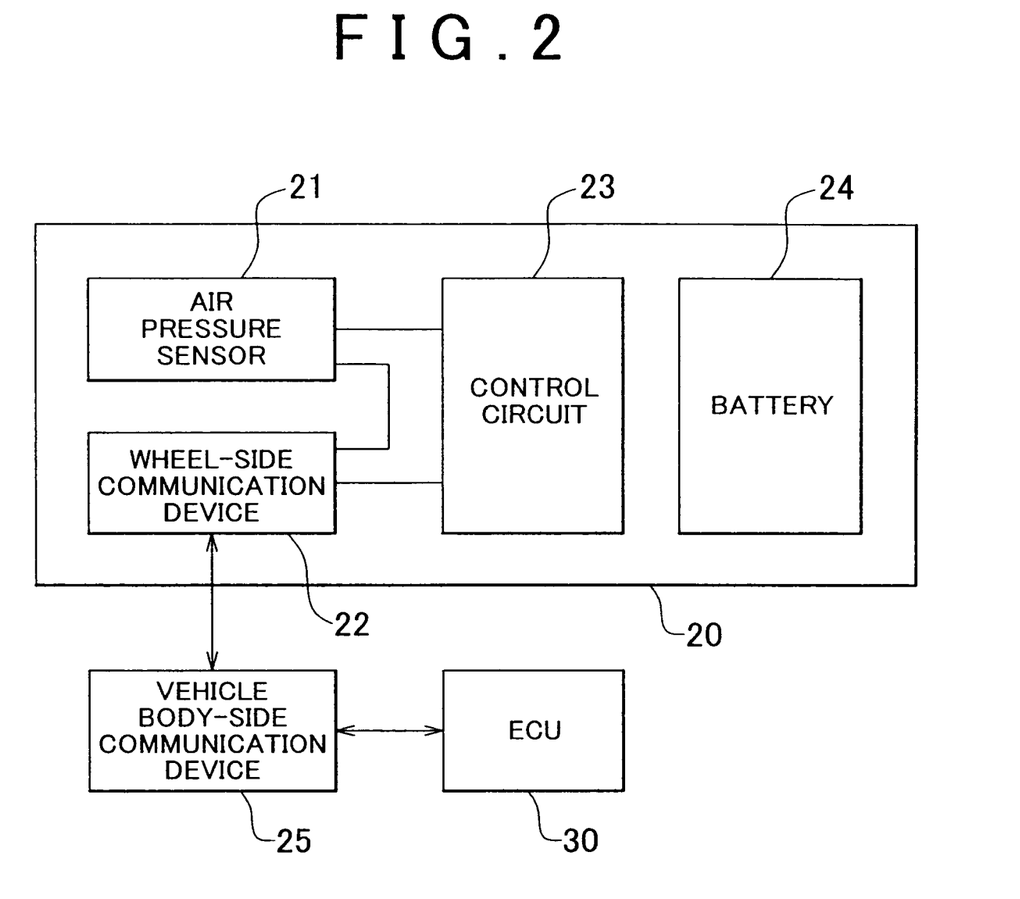
FIG. 2 is a block view of a TPMS valve in the vehicle shown in FIG. 1.

Each TPMS valve 20 has a housing, not shown. As shown in FIG. 2, this housing houses an air pressure sensor 21, a wheel-side communication device 22, a control circuit 23, and a battery 24. Thus, each TPMS valve 20 also functions as vehicle information obtaining means for obtaining the tire air pressure as wheel information and transmitting the obtained wheel information at regular intervals. The air pressure sensor 21 is, for example, a semiconductor sensor, which detects the air pressure inside the tire. The wheel-side communication device 22 can wirelessly transmit a signal indicative of a detected value from the air pressure sensor 21 regularly at predetermined cycles (such as three minute intervals). The control circuit 23 is mounted on an IC chip or the like and controls the air pressure sensor 21 and the wheel-side communication device 22. The battery 24 supplies power to the air pressure sensor 21, the wheel-side communication device 22, and the control circuit 23. The TPMS valve 20 may also include a temperature sensor for detecting the air temperature inside the tire, a longitudinal acceleration sensor, a lateral G sensor, a vertical pressure sensor, and the like.

Also in the vehicle 10 according to this example embodiment, a unique ID code is assigned to each wheel-side communication device 22 in the TPMS valve 20 of each wheel 14. In this example embodiment, for example, an ID code of 1 is assigned to the wheel-side communication device 22 of the TPMS valve 20 mounted to the right front wheel 14, an ID code of 2 is assigned to the wheel-side communication device 22 of the TPMS valve 20 mounted to the left front wheel 14, an ID code of 3 is assigned to the wheel-side communication device 22 of the TPMS valve 20 mounted to the right rear wheel 14, an ID code of 4 is assigned to the wheel-side communication device 22 of the TPMS valve 20 mounted to the left rear wheel 14, and an ID code of 5 is assigned to the wheel-side communication device 22 of the TPMS valve 20 mounted to the spare wheel 15. The signal regularly transmitted from each wheel-side communication device 22 includes both the detected value from the air pressure sensor 21 as well as the ID code indicating the wheel-side communication device 22 sending the signal. That is, each wheel-side communication device 22 regularly transmits, at predetermined cycles, a signal that includes the detected value from the air pressure sensor 21 and a unique ID code. The signal starts to be regularly transmitted from the wheel-side communication device 22 in this manner from the stage when the TPMS valve 20 is attached to the wheel 14, which is formed by mounting a tire on a wheel, and shipped as an assembly from the plant.

Meanwhile, as shown in FIGS. 1 and 2, an electronic control unit (hereinafter simply referred to as "ECU") 30 is mounted to the body 12 of the vehicle 10. This ECU 30 functions as processing means for executing various controls using information transmitted from the wheel-side communication device 22 in the TPMS valve 20. The ECU 30 includes a CPU which executes various computations, ROM which stores various control programs, RAM which is used as a work area for storing data and executing programs, an input/output interface, and a storage device, and the like. As shown in FIG. 1, the ECU 30 is connected to a vehicle body-side communication device 25, a group of sensors 26, and a warning device 27. The ECU 30 is also connected to an onboard battery 29 via an ignition switch 28 of the vehicle 10. When the ignition switch 28 is turned on, the onboard battery 29 supplies power to the vehicle body-side communication device 25, the group of sensors 26, the warning device 27, and the ECU 30, and the like.

The vehicle body-side communication device 25 transmits and receives signals to and from the wheel-side communication device 22 in the TPMS valve 20 of each wheel 14. The vehicle body-side communication device 25 receives the signal that was wirelessly transmitted from the wheel-side communication device 22 and passes it on to the ECU 30. The group of sensors 26 includes, for example, a wheel speed sensor, not shown, provided on each wheel 14, for detecting the speed of the corresponding wheel 14. The warning device 27 is controlled by the ECU 30 to issue a warning to a driver under predetermined conditions, and includes, for example, a warning display apparatus provided in an instrument panel of the vehicle 10, and the like.

The vehicle information processing apparatus according to the invention mainly includes the TPMS valves 20 including the wheel-side communication devices 22, the vehicle body-side communication device 25, and the ECU 30, and the like, described above. While the vehicle 10 is running, for example, the air pressure sensor 21 of each TPMS valve 20 detects the air pressures of the wheels 14 and 15, and each wheel-side communication device 22 wirelessly transmits a signal indicative of the detected value from the air pressure sensor 21 and its unique ID to the vehicle body-side communication device 25 at regular intervals. When the vehicle body-side communication device 25 receives a signal from one of the wheel-side communication devices 22, the ECU 30 executes a predetermined routine using the received signal when the ID included in the signal received by the vehicle body-side communication device 25 matches one of the IDs stored (i.e., registered) in the storage device. Thus, the ID of the wheel-side communication device 22 in each TPMS valve 20 must be registered with the ECU 30 by the time the vehicle 10 is shipped in order for the vehicle information processing apparatus to function. The procedure for registering the ID of the wheel-side communication device 22 in each TPMS valve 20 provided in the vehicle 10 described above will therefore be described next with reference to FIG. 3.

Figure 3:
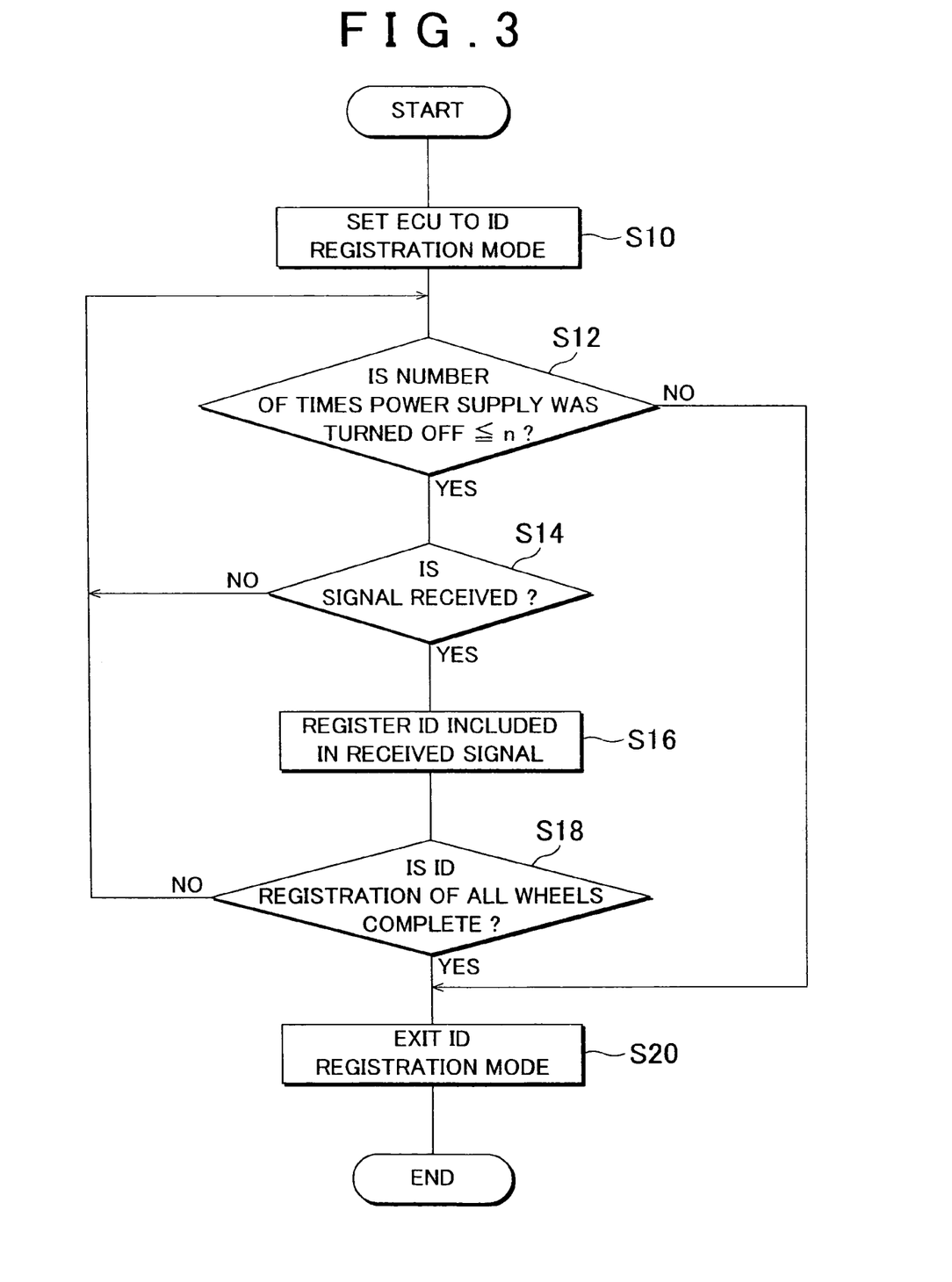
FIG. 3 is a flowchart illustrating a routine for registering an ID of a wheel-side communication device in each TPMS valve provided in the vehicle shown in FIG. 1, with the vehicle body side.

In the vehicle 10 in this example embodiment, the ID of the wheel-side communication device 22 in each TPMS valve 20 is registered either in the production line of the vehicle 10 after the wheels 14 and 15, the ECU 30, and the like have been mounted to the vehicle body 12, or during inspection and maintenance or the like of the vehicle 10. In this case, as shown in FIG. 3, a worker first manually connects the ECU 30 to a control PC or the like and then sets the ECU 30 to an ID registration mode while power is being supplied from the onboard battery 29 (step S10). When the ECU 30 receives a command to shift into the ID registration mode, the CPU of the ECU 30 initiates an ID registration program stored in the storage device in advance. After the command to shift into the ID registration mode is received, the ECU 30 reads the number of times that the ignition switch 28 has been turned off, i.e., reads the number of times that the supply of power to the ECU 30 was interrupted (i.e., the number of times that the power was turned off) during production of the vehicle 10 and determines whether the number of times that the power was turned off is equal to or less than a threshold value n set in advance (step S12).

If it is determined that the number of times that the power was turned off is equal to or less than the threshold value n (i.e., Yes in step S12), the ECU 30 then determines whether a regularly transmitted signal has been received by the vehicle body-side communication device 25 from any of the wheel-side communication devices 22 of the TPMS valves 20 provided in the wheels 14 and 15 (step S14). If it is determined that the vehicle body-side communication device 25 has not received a signal from any of the wheel-side communication devices 22 (i.e., No in step S14), the ECU 30 executes steps S12 and thereafter again.

If it is determined, on the other hand, that the vehicle body-side communication device 25 has received a signal from one of the wheel-side communication devices 22 (i.e., Yes in step S14), the ECU 30 stores and registers the ID included in the signal received by the vehicle body-side communication device 25 in an ID code storage region in the storage device (step S16). When the ID is registered in step S16, the ECU 30 determines whether the IDs of the TPMS valves 20 (i.e., the wheel-side communication devices 22) for all of the wheels 14 and 15 have been registered (step S18). If it is determined that the IDs for all of the wheels 14 and 15 have been registered (i.e., Yes in step S18), the ECU 30 exits the ID registration mode (step S20), thus ending the routine shown in FIG. 3.

Also, if it is determined that not all of the IDs for the wheels 14 and 15 have been registered (i.e., No in step S18), the ECU 30 executes steps S12 and thereafter again. In this case, when the number of times that the power was turned off is equal to or less than the threshold value n (i.e., Yes in step S12), the ID included in the signal received by the vehicle body-side communication device 25 is stored in the ID code storage region of the storage device via the processes in steps S14 and S16. Also, if it is determined that the number of times that the power was turned off is greater than the threshold value n (i.e., No in step S12), the ECU 30 then exits the ID registration mode (step S20), thus ending the routine shown in FIG. 3.

In this way, in the vehicle 10 in this example embodiment, the wheel-side communication devices 22 in the plurality of TPMS valves 20 provided in the wheels 14 and 15 regularly transmit, as a signal, the obtained wheel information along with a unique ID. Upon receiving a command to shift into the ID registration mode while power is supplied from the onboard battery 29, the ECU 30 registers the ID for each TPMS valve 20 (i.e., each wheel-side communication device 22) based on a signal that is regularly transmitted from each wheel-side communication device 22. After receiving the command to shift into the ID registration mode, the ECU 30 remains in the ID registration mode until conditions set in advance (i.e., steps S12 and S18) have been satisfied, at which time the ECU 30 exits the ID registration mode. That is, in the vehicle 10 in this example embodiment, by simply sending the command to the ECU 30 to shift into the ID registration mode, the ID for each TPMS valve 20 (i.e., each wheel-side communication device 22) can then be registered using the regularly transmitted signal from the wheel-side communication device 22 of each TPMS valve 20, without using a device or the like to generate a trigger signal and without the manual labor involved.

By establishing the condition for having the ECU 30 remain in (or exit) the ID registration mode in step S12 based on, for example, the regular transmission cycle of the signal from each wheel-side communication device 22 and/or the step of performing verification in the production line, for example, in addition to determining in step SI 8 whether the IDs for all of the TPMS valves 20 (i.e., wheel-side communication devices 22) have been registered, ID registration of each TPMS valve 20 (i.e., each wheel-side communication device 22) is basically completed with a high degree of reliability at the stage where a sufficient amount of time has passed after the ECU 30 received the command to shift into the ID registration mode.

That is, typically during production or maintenance of the vehicle, the ignition switch or a switch similar thereto is turned on and off relatively often. When the switch is turned on, power is supplied to the ECU and when the switch is turned off, that supply of power is interrupted, i.e., the ECU receives no power. Therefore, by setting the maximum value n of the number of times that the supply of power to the ECU 30 was interrupted, i.e., of the number of times the power supply was turned off, as a condition for having the ECU 30 remain in (or exit) the ID registration mode based on the regular transmission cycle of the signal from each wheel-side communication device 22 and/or the step of verification in the production line, for example, ID registration for all of the TPMS valves 20 (i.e., the wheel-side communication devices 22) can be completed with a high degree of reliability during production or maintenance of the vehicle 10 as long as there are no abnormalities in the wheel-side communication devices 22, the vehicle body-side communication device 25, or the ECU 30. In step S12 described above, it is determined whether the number of times the power supply was turned off is equal to or less than the preset threshold value n. Instead, however, it may be determined whether the number of times the power supply was turned on is equal to or less than a preset threshold value. In this mode as well, ID registration of all of the TPMS valves 20 (i.e., the wheel-side communication devices 22) can be completed with a high degree of reliability during production or maintenance of the vehicle 10.

As a result, in the vehicle 10 in this example embodiment, it is possible to effectively reduce the amount of labor involved in registering the IDs of the vehicle information obtaining means. The routine in FIG. 3 is temporarily interrupted when the ignition switch is turned off, i.e., when power stops being supplied to the ECU 30, during production or maintenance of the vehicle 10, but then continues again when the ignition switch is turned back on and power is once again supplied to the ECU 30.

Figure 4:
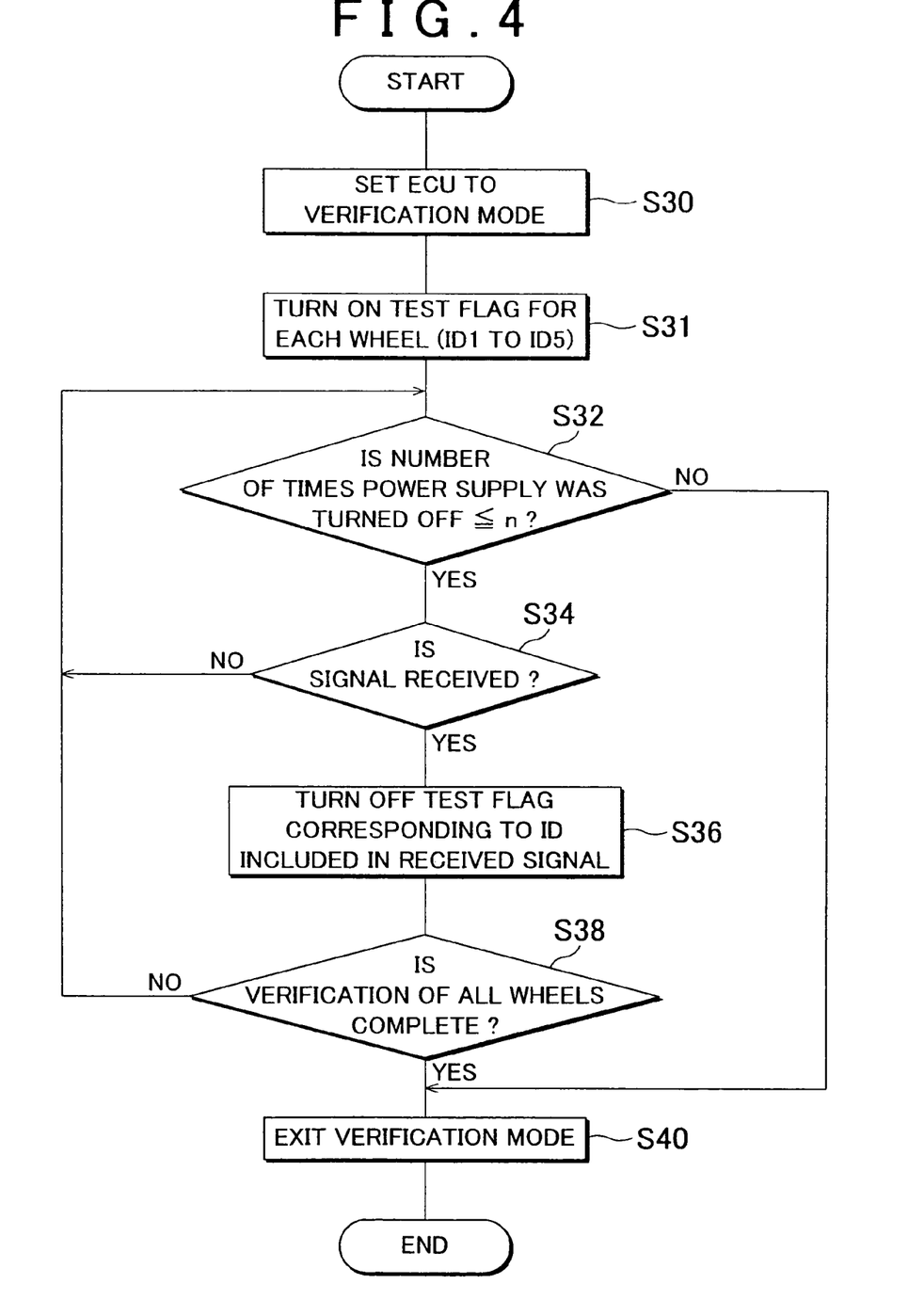
FIG. 4 is a flowchart illustrating a routine for verifying the wheel-side communication device of each TPMS valve provided in the vehicle shown in FIG. 1.

In this way, once registration of the IDs for the wheel-side communication devices 22 of the TPMS valves 20 provided in the wheels 14 and 15 is complete, the wheel-side communication device 22 of each TPMS valve 20 is then verified. This verification is performed, for example, in the production line or during inspection and maintenance of the vehicle 10 after the IDs have been registered. FIG. 4 is a flowchart illustrating a routine for verifying the wheel-side communication device of each TPMS valve provided in the vehicle 10.

As shown in FIG. 4, when verifying the wheel-side communication devices 22, a worker first manually connects the ECU 30 to a control PC or the like and sets the ECU 30 to a verification mode while power is being supplied from the onboard battery 29 (step S30). Upon receiving a command to shift into the verification mode, the CPU of the ECU 30 initiates a verification program stored beforehand in the storage device and turns on a test flag for the wheel-side communication device 22 of each TPMS valve 20 (step S31). Accordingly, a predetermined diagnosis code is displayed for each wheel-side communication device 22 on a display portion of the control PC or on the instrument panel. After receiving the command to shift into the verification mode, the ECU 30 then reads the number of times the ignition switch 28 has been turned off, i.e., the number of times the power supply was turned off, during production of the vehicle 10 and determines whether that number is equal to or less than a preset threshold value n (step S32).

If the number of times that the power supply was turned off is equal to or less than the threshold value n (i.e., Yes in step S32), the ECU 30 determines whether the vehicle body-side communication device 25 received a regularly transmitted signal from any of the wheel-side communication devices 22 in the TPMS valves 20 provided in the wheels 14 and 15 (step S34). If it is determined that the vehicle body-side communication device 25 has not received a signal from any of the wheel-side communication devices 22 (i.e., No in step S34), the ECU 30 executes steps S32 and thereafter again.

If it is determined, on the other hand, that the vehicle body-side communication device 25 has received a signal from one of the wheel-side communication devices 22 (i.e., Yes in step S34), the ECU 30 first verifies the data transmission state of the wheel-side communication device 22 and the detection state of the air pressure sensor 21 and the like based on the information in the signal received by the vehicle body-side communication device 25, and then turns off the test flag for the wheel-side communication device 22 (i.e., the TPMS valve 20) corresponding to the ID included in the signal that was received by the vehicle body-side communication device 25 (step S36). Accordingly, the diagnosis code for the wheel-side communication device 22 that was displayed on the display portion of the control PC or the instrument panel is erased. Then when step S34 is executed, the ECU 30 determines whether the wheel-side communication devices 22 for all of the wheels 14 and 15 have been verified (step S38). If so (i.e., Yes in step S38), the ECU 30 exits the verification mode (step S40), thus ending the routine in FIG. 4.

Also, if it is determined that not all of the wheels 14 and 15 have been verified (i.e., No in step S38), the ECU 30 executes steps S32 and thereafter again. In this case, when the number of times that the power was turned off is equal to or less than the threshold value n (i.e., Yes in step S32), the wheel-side communication device 22 is verified through the processes in steps S34 and S36. Also, if it is determined that the number of times that the power was turned off is greater than the threshold value n (i.e., No in step S32), the ECU 30 then exits the verification mode (step S40), thus ending the routine shown in FIG. 4.

In this way, in the vehicle 10 in this example embodiment, upon receiving a command to shift into the verification mode while power is being supplied from the onboard battery 29, the ECU 30 verifies the wheel-side communication device 22 in each TPMS valve 20 based on the signal transmitted at regular intervals from each wheel-side communication device 22. After receiving the command to shift into the verification mode, the ECU 30 then remains in the verification mode until preset conditions (i.e., steps S32 and S38) have been satisfied, at which time the ECU 30 exits the verification mode. That is, in the vehicle 10 in this example embodiment, by simply sending the command to the ECU 30 to shift into the verification mode, the wheel-side communication devices 22 can then be verified using the regularly transmitted signals from the wheel-side communication devices 22, without using a device or the like to generate a trigger signal and without the manual labor involved.

By establishing the condition for having the ECU 30 remain in (or exit) the verification mode in step S32 based on, for example, the regular transmission cycle of the signal from each of the wheel-side communication devices 22 and/or the step of verification in the production line, for example, in addition to determining whether verification of all of the wheel-side communication devices 22 has been completed in step S38, verification of the wheel-side communication device 22 in each TPMS valve 20 is basically completed with a high degree of reliability at the stage where a sufficient period of time has passed after the ECU 30 received the command to shift into the verification mode.

That is, typically during production or maintenance of the vehicle, the ignition switch or a switch similar thereto is turned on and off relatively often. When the switch is turned on, power is supplied to the ECU and when the switch is turned off, that supply of power is interrupted, i.e., the ECU receives no power. Therefore, by setting the maximum value n of the number of times that the supply of power to the ECU 30 was interrupted, i.e., of the number of times the power supply was turned off, as a condition for having the ECU 30 remain in (or exit) the verification mode based on the regular transmission cycle of the signal from each wheel-side communication device 22 and/or the step of verification in the production line, for example, verification of all of the TPMS valves 20 (i.e., the wheel-side communication devices 22) can be completed with a high degree of reliability during production or maintenance of the vehicle 10 as long as there are no abnormalities in the wheel-side communication devices 22, the vehicle body-side communication device 25, or the ECU 30. In step S32 described above, it is determined whether the number of times the power supply was turned off is equal to or less than the preset threshold value n. Instead, however, it may be determined whether the number of times the power supply was turned on is equal to or less than a preset threshold value. In this mode as well, verification of all of the TPMS valves 20 (i.e., all of the wheel-side communication devices 22) can be completed with a high degree of reliability during production or maintenance of the vehicle 10.

As a result, in the vehicle 10 in this example embodiment, the wheel-side communication devices 22 and the like in the TPMS valves 20 can be verified with much less labor. The routine in FIG. 4 is also temporarily interrupted when the ignition switch is turned off, i.e., when power stops being supplied to the ECU 30, during production or maintenance of the vehicle 10, but then continues again when the ignition switch is turned back on and power is once again supplied to the ECU 30.

Figure 5:
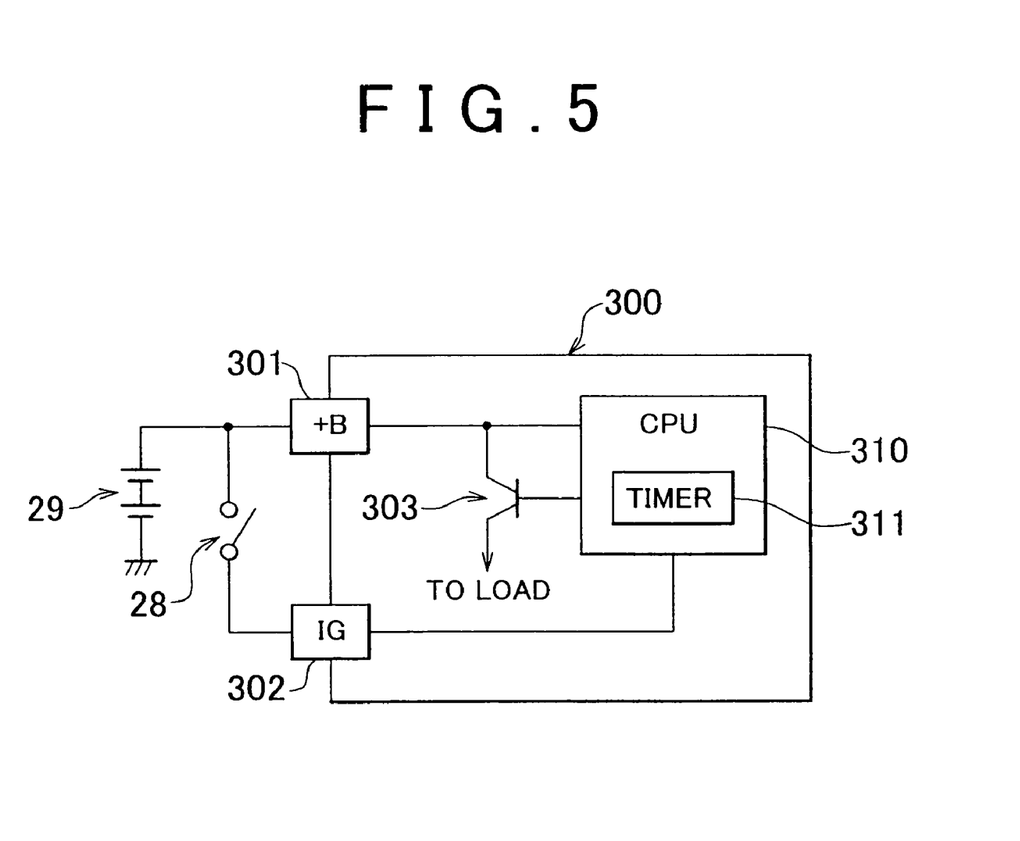
FIG. 5 is a block diagram of a modified example of the vehicle information processing apparatus according to the invention.

FIG. 5 is a block diagram of a modified example of the vehicle information processing apparatus according to the invention. An ECU 300 illustrated in FIG. 5 is structured such that power can be received from the onboard battery 29 for a predetermined period of time even after the ignition switch 28, which controls (i.e., either allows or interrupts) the supply of power from the onboard battery 29, has been turned off.

That is, the ECU 300 shown in FIG. 5 has a battery side terminal 301 and an ignition (IG) side terminal 302 as terminals for supplying power. The battery side terminal 301 is connected to a CPU 310 of the ECU 300 as well as to a positive terminal of the onboard battery 29. Also, the IG side terminal 302 is connected to the CPU 310 of the ECU 300 as well as one terminal of the ignition switch 28. The other terminal of the ignition switch 28 is connected to the positive terminal of the onboard battery 29. Also, a switching element 303 such as a transistor which is normally off is connected to a lead wire which connects the battery side terminal 301 and the CPU 310. The battery side terminal 301 is also connected to a load such as an IC chip via the switching element 303. The 310 houses a timer 311. When the ignition switch 28 is turned off, the switching element 303 turns on and then turns off when the amount of time that is timed by the timer 311 reaches a predetermined value.

Accordingly, when the ignition switch 28 is on, the battery side terminal 301 does not function as a supply power terminal. Instead, power is supplied from the onboard battery 29 to the CPU 310 and other loads via the IG side terminal 302. Also, when the ignition switch 28 is turned off, the IG side terminal 302 ceases to function as a power supply terminal. However, because the switching element 303 is turned on for a predetermined period of time, power is supplied from the onboard battery 29 to the CPU 310 and other loads via the battery side terminal 301 during that time. As a result, when performing verification or ID registration of the wheel-side communication device 22 in each TPMS valve 20 during production of the vehicle, for example, power is supplied from the onboard battery 29 to the ECU 300 for a predetermined time even after the ignition switch 28 or a similar switch has been turned off. As a result, the ECU 300 is able to receive signals from the wheel-side communication devices 22. Accordingly, employing the structure illustrated in FIG. 5 enables the period of time that verification is interrupted due to the supply of power to the ECU 300 being interrupted, to be shortened, therefore enabling the verification and ID registration of the wheel-side communication devices 22 in the TPMS valves 20 to be completed quickly.

In the foregoing description, the vehicle information obtaining means is a TPMS valve 20 that is provided in each wheel of a vehicle, but it is not limited to this. That is, the vehicle information obtaining means may alternatively be provided in the vehicle body and communicate wirelessly with processing means on the vehicle body or outside the vehicle. Further, the ECU 30 and the ECU 300 described above may also be provided on a wheel or outside the vehicle.

What is claimed is:

1. A vehicle information processing apparatus for processing vehicle information relating to a vehicle, comprising:
 a plurality of vehicle information obtaining devices that obtain vehicle information and transmitting, as a signal, the obtained vehicle information together with an ID at regular intervals, said ID being unique to each of the vehicle information obtaining devices;
 a controller that receives the vehicle information from each of the vehicle information obtaining devices and processes that vehicle information; and
 a power supply which supplies power to the controller, wherein the controller:
 performs a predetermined verification based on the signal transmitted at regular intervals from each of the vehicle information obtaining devices upon receiving a command to shift into a verification mode while power is being supplied from the power supply; and,
 after the command to shift into the verification mode is received by the controller, the controller performs a comparison with respect to a number of times supply of power to the controller was stopped or started, and the controller remains in the verification mode until the number of times that the supply of power to the controller was stopped or started exceeds a predetermined value.

2. The vehicle information processing apparatus according to claim 1, wherein, after the command to shift into the verification mode is received by the controller, the controller exits the verification mode after verification of all of the vehicle information obtaining devices is complete.

3. The vehicle information processing apparatus according to claim 1, further comprising:
 a switch which selectively allows and prevents the supply of power from the power supply to the controller; and
 a device that enables power to be supplied to the controller for period of time after the switch is turned off.

4. The vehicle information processing apparatus according to claim 1, wherein the vehicle information obtaining device is provided in each wheel of the vehicle and the controller is provided on a body of the vehicle; and the vehicle information obtaining device obtains predetermined information relating to the wheel as vehicle information.

5. The vehicle information processing apparatus according to claim 1, wherein the controller reads a number of times an ignition switch has been turned on or turned off to determine the number of times the supply of power to the controller was stopped or started.

6. The vehicle information processing apparatus according to claim 5, wherein, when the controller is in the verification mode, the predetermined verification is temporarily interrupted when the ignition switch is turned off and the predetermined verification then continues after the ignition switch is turned back on.

7. A vehicle information processing apparatus for processing vehicle information relating to a vehicle, comprising:
 a plurality of vehicle information obtaining devices that obtain vehicle information and transmitting, as a signal, the obtained vehicle information together with an ID at regular intervals, said ID being unique to each of the vehicle information obtaining devices;

a controller that receives the vehicle information from each of the vehicle information obtaining devices and processes that vehicle information; and a power supply which supplies power to the controller, wherein the controller:

performs ID registration for each of the vehicle information obtaining devices based on the signal transmitted at regular intervals from each of the vehicle information obtaining devices upon receiving a command to shift into an ID registration mode while power is being supplied from the power supply; and, after the command to shift into the ID registration mode is received by the controller, the controller performs a comparison with respect to a number of times supply of power to the controller was stopped or started, and the controller remains in the ID registration mode until the number of times that the supply of power to the controller was stopped or started exceeds a predetermined value.

8. The vehicle information processing apparatus according to claim 7, wherein, after the command to shift into the ID registration mode is received by the controller, the controller exits the ID registration mode after ID registration of all of the vehicle information obtaining devices is complete.

9. The vehicle information processing apparatus according to claim 7, further comprising:

a switch which selectively allows and prevents the supply of power from the power supply to the controller; and a device that enables power to be supplied to the controller for a period of time after the switch is turned off.

10. The vehicle information processing apparatus according to claim 7, wherein the vehicle information obtaining device is provided in each wheel of the vehicle and the controller is provided on a body of the vehicle; and the vehicle information obtaining device obtains predetermined information relating to the wheel as vehicle information.

11. The vehicle information processing apparatus according to claim 7, wherein the controller reads a number of times an ignition switch has been turned on or turned off to determine the number of times the supply of power to the controller was stopped or started.

12. The vehicle information processing apparatus according to claim 11, wherein, when the controller is in the ID registration mode, the ID registration is temporarily interrupted when the ignition switch is turned off and the ID registration then continues after the ignition switch is turned back on.

13. A verification method of a vehicle information processing apparatus provided with a plurality of vehicle information obtaining devices that obtain vehicle information and transmitting, as a signal, the obtained vehicle information together with an ID at regular intervals, said ID being unique to each of the vehicle information obtaining devices, and a controller that receives the vehicle information from each of the vehicle information obtaining devices and processes that vehicle information, comprising the steps of:

a) shifting the controller into a verification mode for performing a predetermined verification based on the signal transmitted at regular intervals from each of the vehicle information obtaining devices;

b) determining whether the number of times that the supply of power to the controller was stopped or started exceeds a predetermined value after a command to shift the controller into the verification mode is received by the controller; and c) exiting the verification mode when it is determined in step b) that the number of times that the supply of power to the controller was stopped or started exceeds the predetermined value.

14. The verification method of a vehicle information processing apparatus according to claim 13, further comprising the step of:

determining whether the verification of all of the vehicle information obtaining devices is complete after the command to shift the controller into the verification mode is received by the controller, wherein in step c) the verification mode is exited when either it is determined that the number of times that the supply of power to the controller was stopped or started exceeds the predetermined value or it is determined that the verification of all of the vehicle information obtaining devices is complete.

15. The verification method according to claim 13, wherein the shifting the controller into a verification mode includes inputting a command into a device external to the vehicle, and the device then communicates with the controller to set the controller in the verification mode, and wherein the determining of the number of times supply of power to the controller was stopped or started includes counting the number of times an ignition switch was turned on or turned off.

16. An ID registration method of a vehicle information processing apparatus provided with a plurality of vehicle information obtaining devices that obtain vehicle information and transmitting, as a signal, the obtained vehicle information together with an ID at regular intervals, said ID being unique to each of the vehicle information obtaining devices, and a controller that receiving the vehicle information from each of the vehicle information obtaining devices and processes that vehicle information, comprising the steps of:

a) shifting the controller into an ID registration mode for performing ID registration of each of the vehicle information obtaining devices based on the signal transmitted at regular intervals from each of the vehicle information obtaining devices;

b) determining whether the number of times that the supply of power to the controller was stopped or started exceeds a predetermined value after a command to shift the controller into the ID registration mode is received by the controller; and c) exiting the ID registration mode when it is determined in step b) that the number of times that the supply of power to the controller was stopped or started exceeds the predetermined value.

17. The ID registration method of a vehicle information processing apparatus according to claim 16, further comprising the step of:

determining whether the ID registration of all of the vehicle information obtaining devices is complete after the command to shift the controller into the ID registration mode is received by the controller, wherein in step c) the ID registration mode is exited when either it is determined that the number of times that the supply of power to the controller was stopped or started exceeds the predetermined value or it is determined that the ID registration of all of the vehicle information obtaining devices is complete.

18. The ID registration method according to claim 16, wherein the shifting the controller into an ID registration mode includes inputting a command into a device external to the vehicle, and the device then communicates with the controller to set the controller in the ID registration mode, and wherein the determining of the number of times supply of power to the controller was stopped or started includes counting the number of times an ignition switch was turned on or turned off.

19. A vehicle information processing apparatus for processing vehicle information relating to a vehicle, comprising:
   a plurality of vehicle information obtaining means for obtaining vehicle information and transmitting, as a signal, the obtained vehicle information together with an ID at regular intervals, said ID being unique to each of the vehicle information obtaining means;
   processing means for receiving the vehicle information from each of the vehicle information obtaining means and processing that vehicle information; and
   a power supply which supplies power to the processing means,
   wherein the processing means
   performs a predetermined verification based on the signal transmitted at regular intervals from each of the vehicle information obtaining means upon receiving a command to shift into a verification mode while power is being supplied from the power supply; and,
   after the command to shift into the verification mode is received by the processing means, the processing means performs a comparison with respect to a number of times supply of power to the processing means was stopped or started, and the processing means remains in the verification mode until the number of times that the supply of power to the processing means was stopped or started exceeds a predetermined value.

20. A vehicle information processing apparatus for processing vehicle information relating to a vehicle, comprising:
   a plurality of vehicle information obtaining means for obtaining vehicle information and transmitting, as a signal, the obtained vehicle information together with an ID at regular intervals, said ID being unique to each of the vehicle information obtaining means;
   processing means for receiving the vehicle information from each of the vehicle information obtaining means and processing that vehicle information; and
   a power supply which supplies power to the processing means,
   wherein the processing means
   performs ID registration for each of the vehicle information obtaining means based on the signal transmitted at regular intervals from each of the vehicle information obtaining means upon receiving a command to shift into an ID registration mode while power is being supplied from the power supply; and,
   after the command to shift into the ID registration mode is received by the processing means, the processing means performs a comparison with respect to a number of times supply of power to the processing means was stopped or started, and the processing means remains in the ID registration mode until the number of times that the supply of power to the processing means was stopped or started exceeds a predetermined value.

* * * * *